A. J. HODGE & H. B. RUGGLES.
MACHINE FOR PRODUCING EITHER SOLID OR HOLLOW FIBROUS PULP ARTICLES OF VARIOUS FORMS.
APPLICATION FILED APR. 28, 1915.

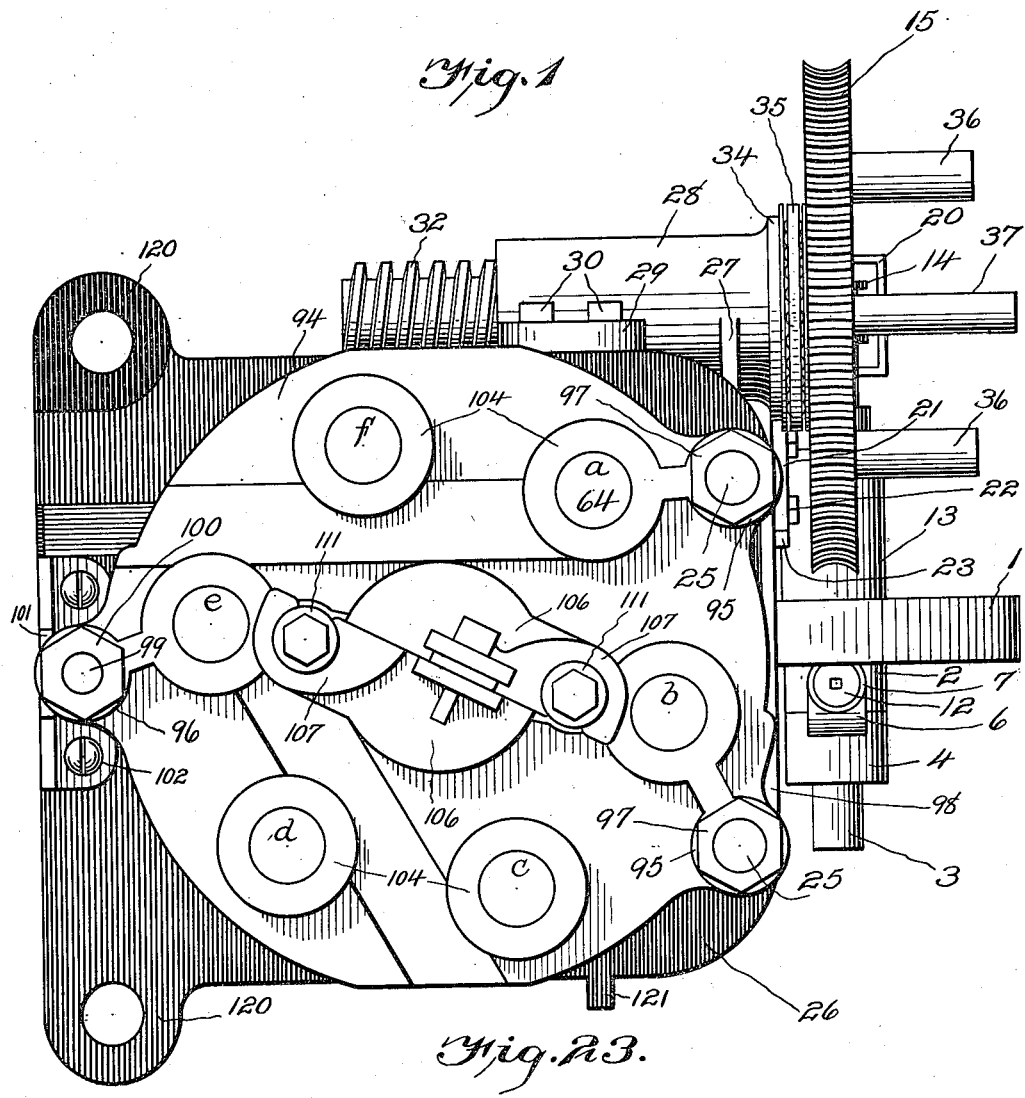
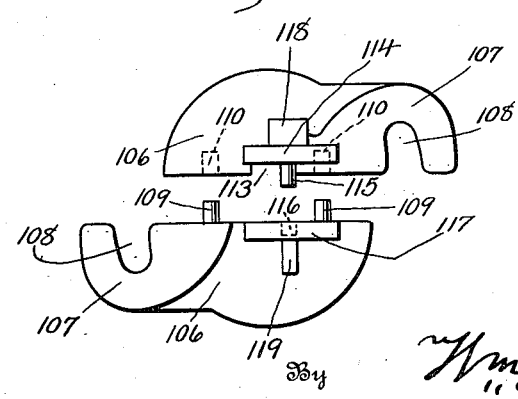

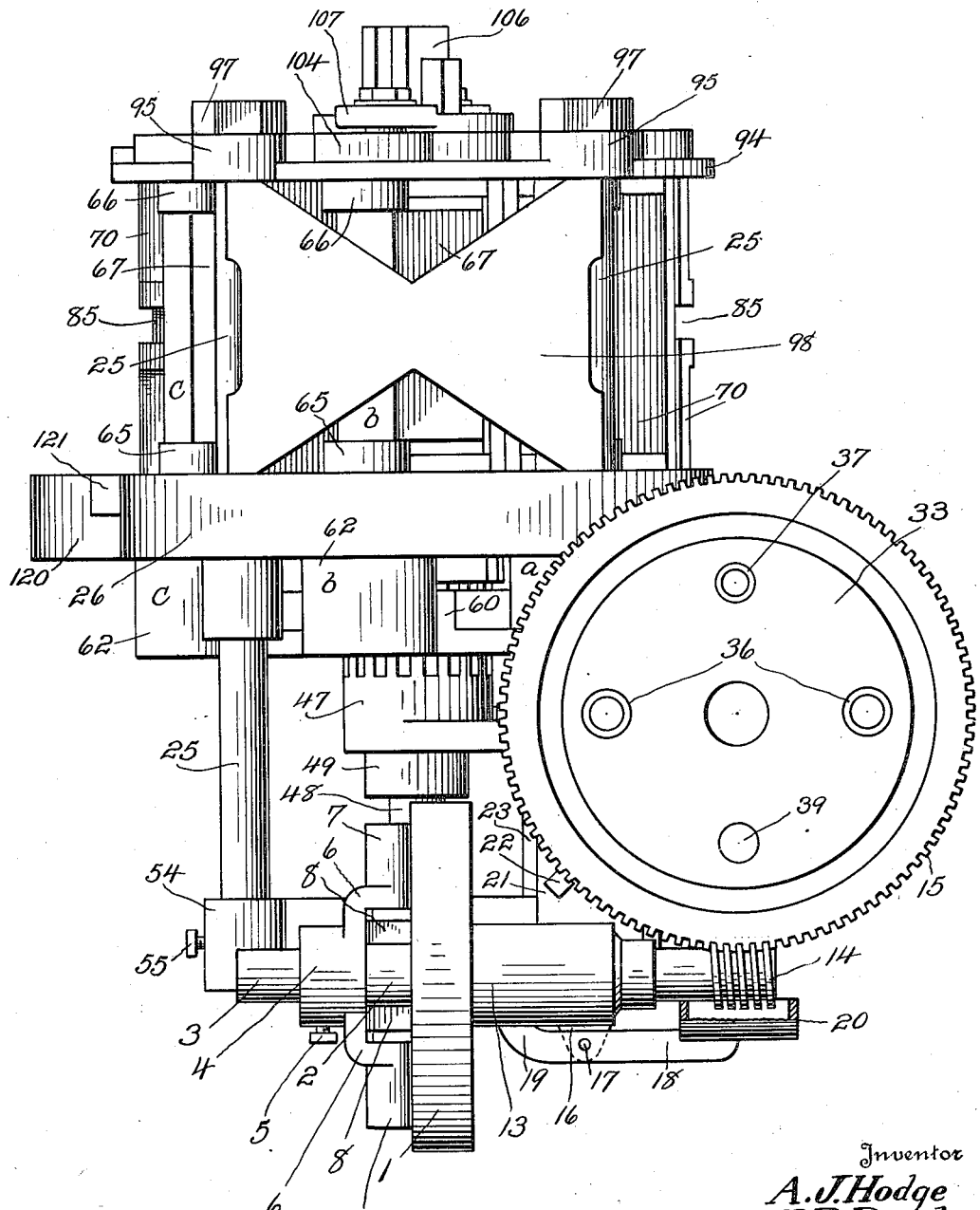

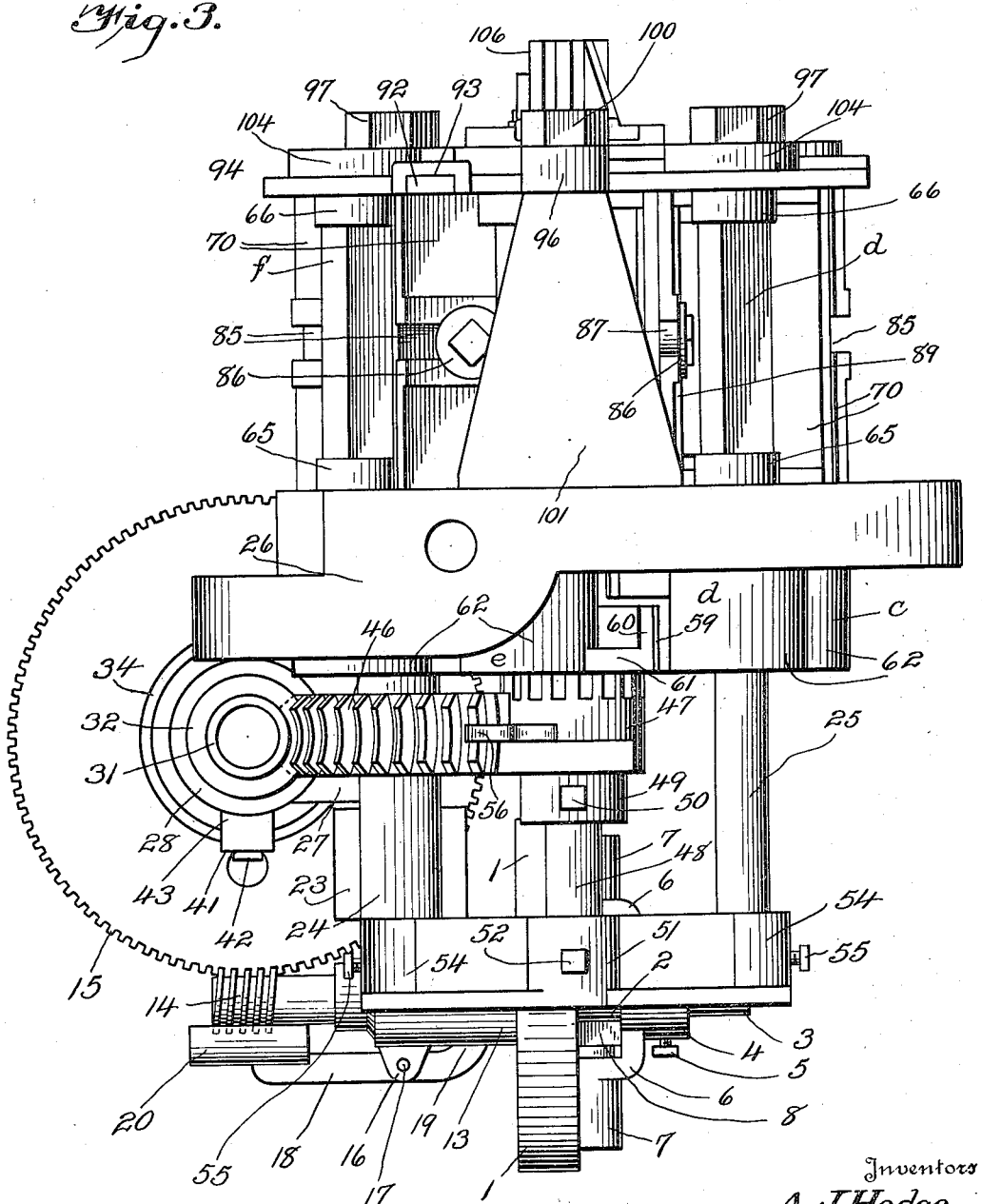

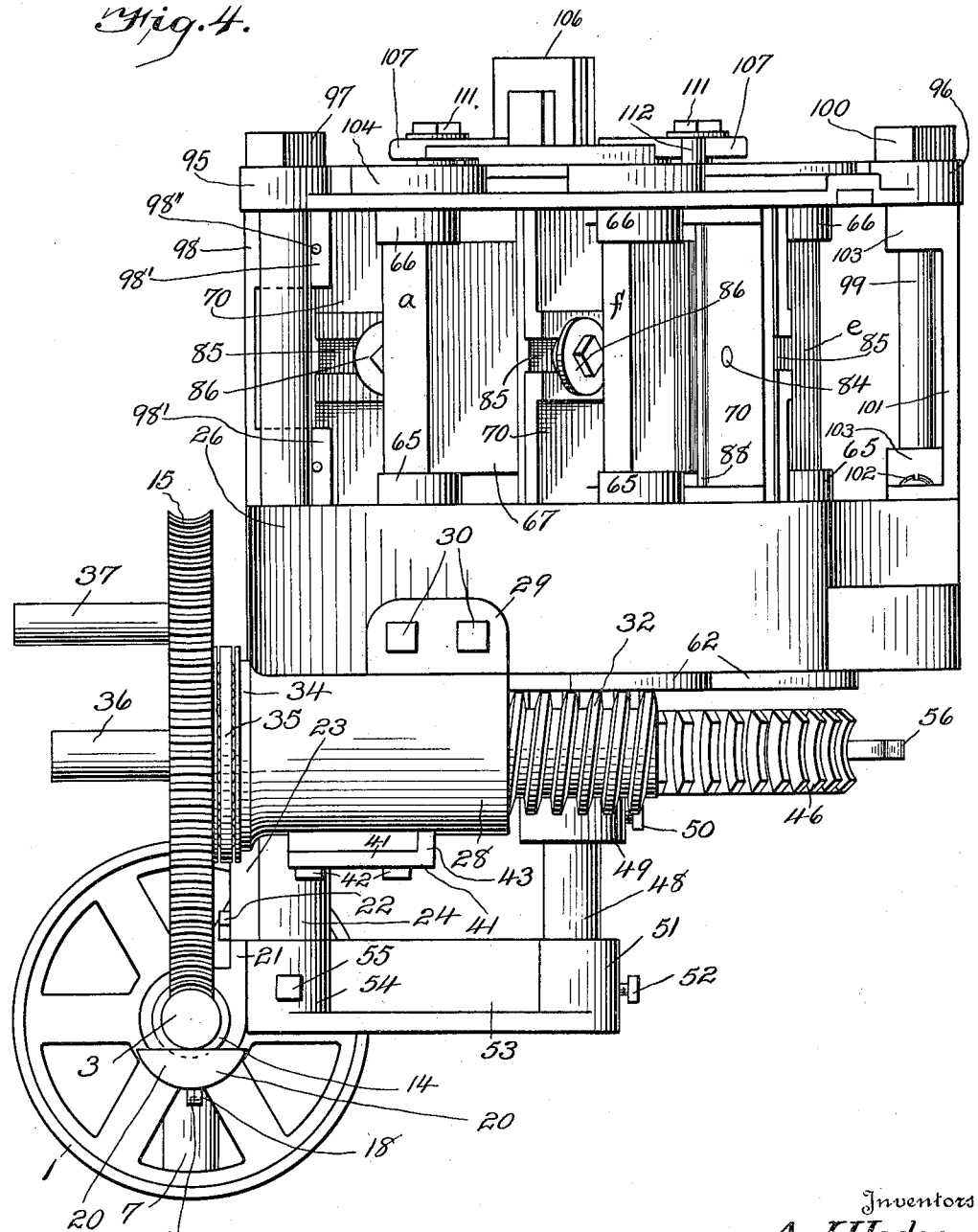

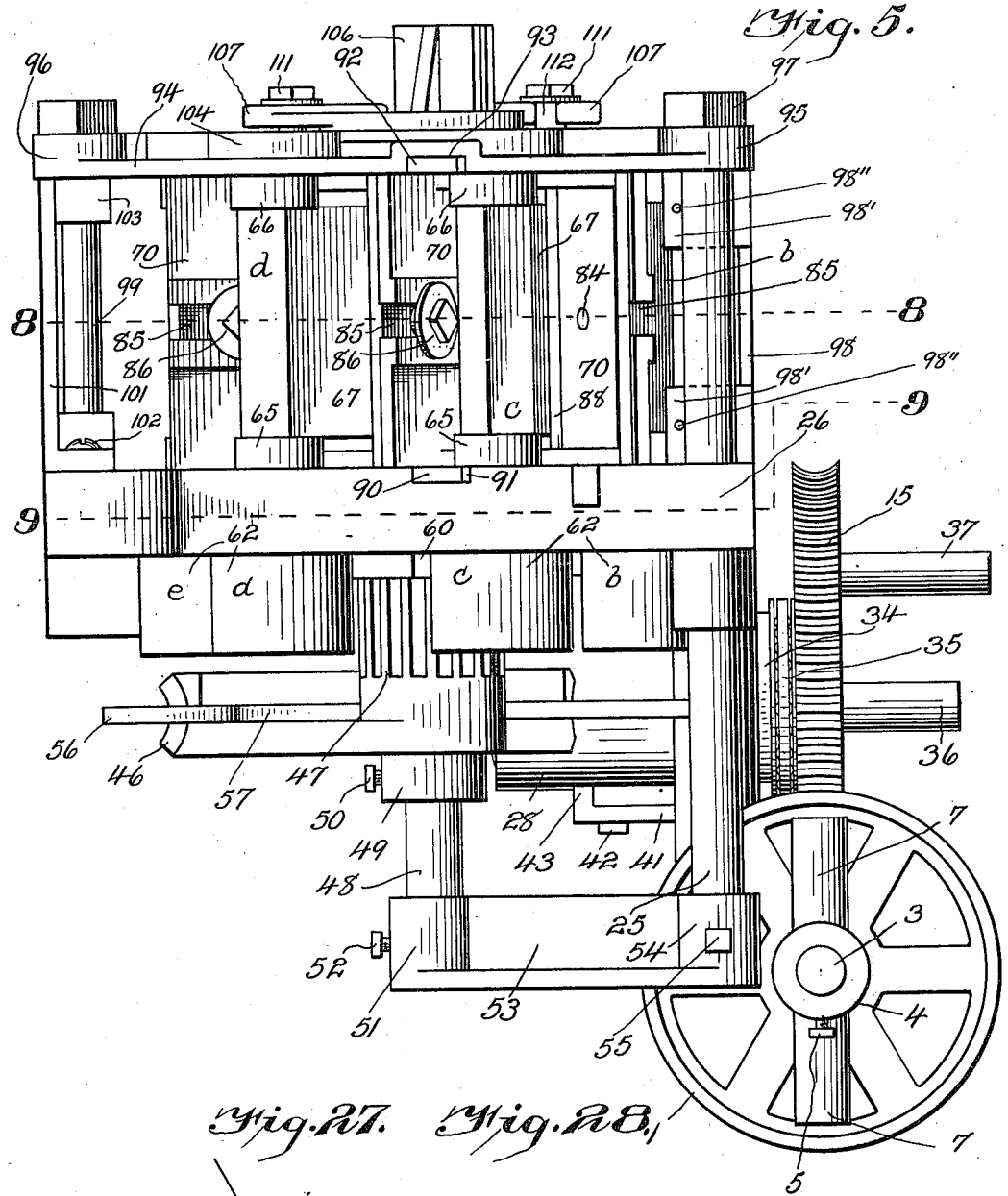

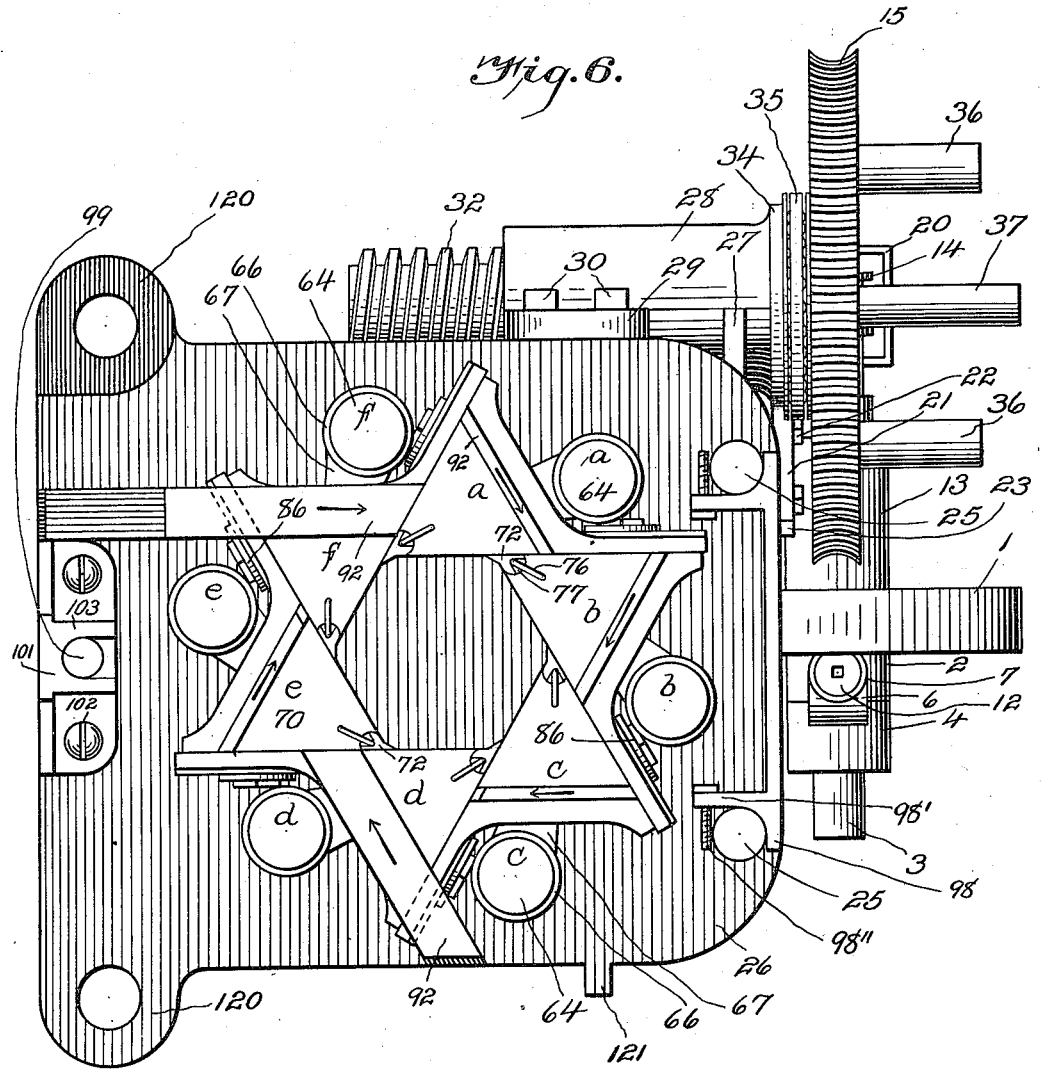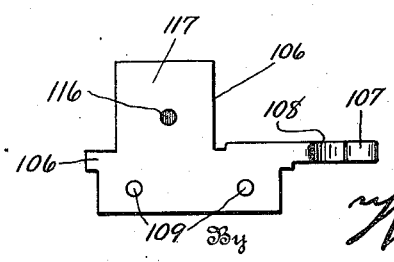

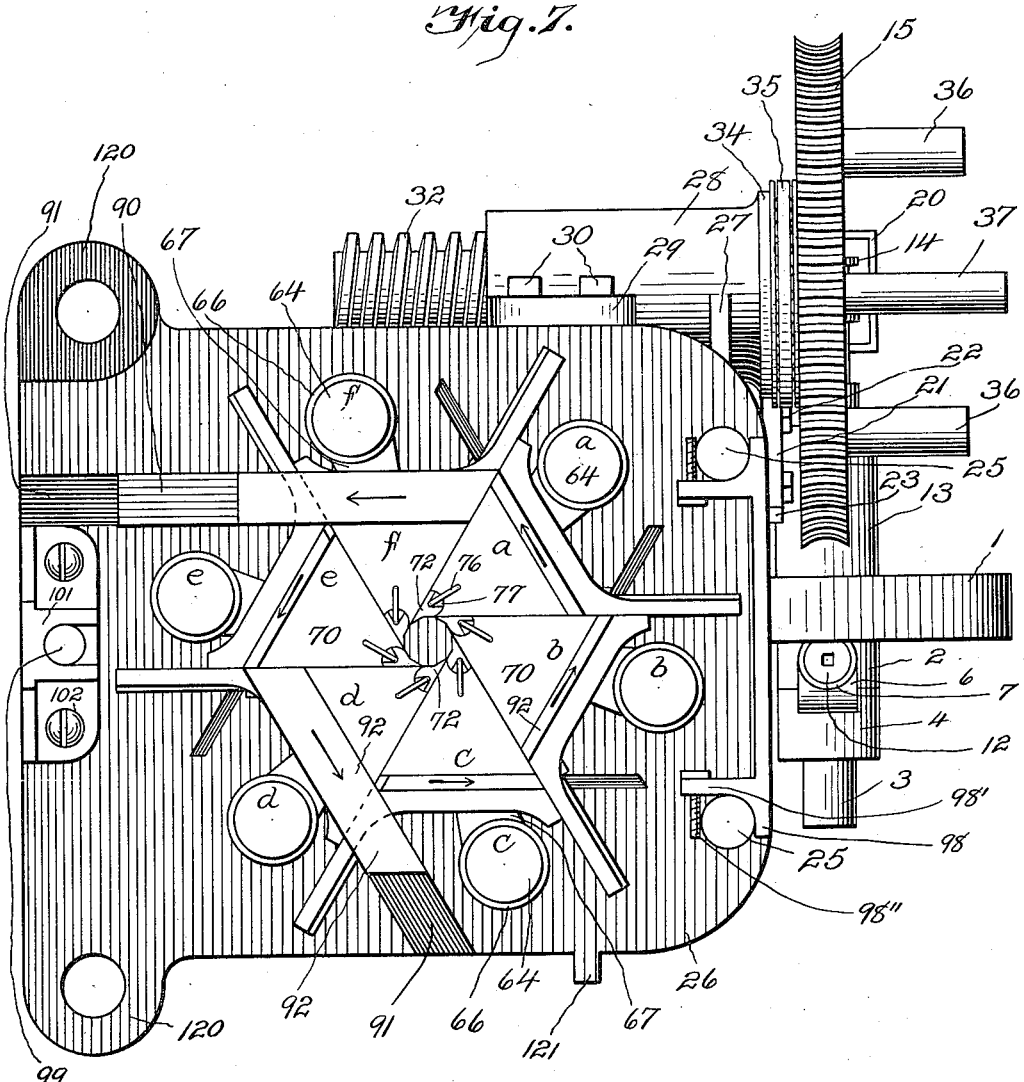
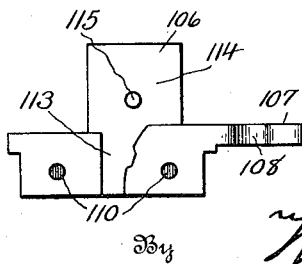

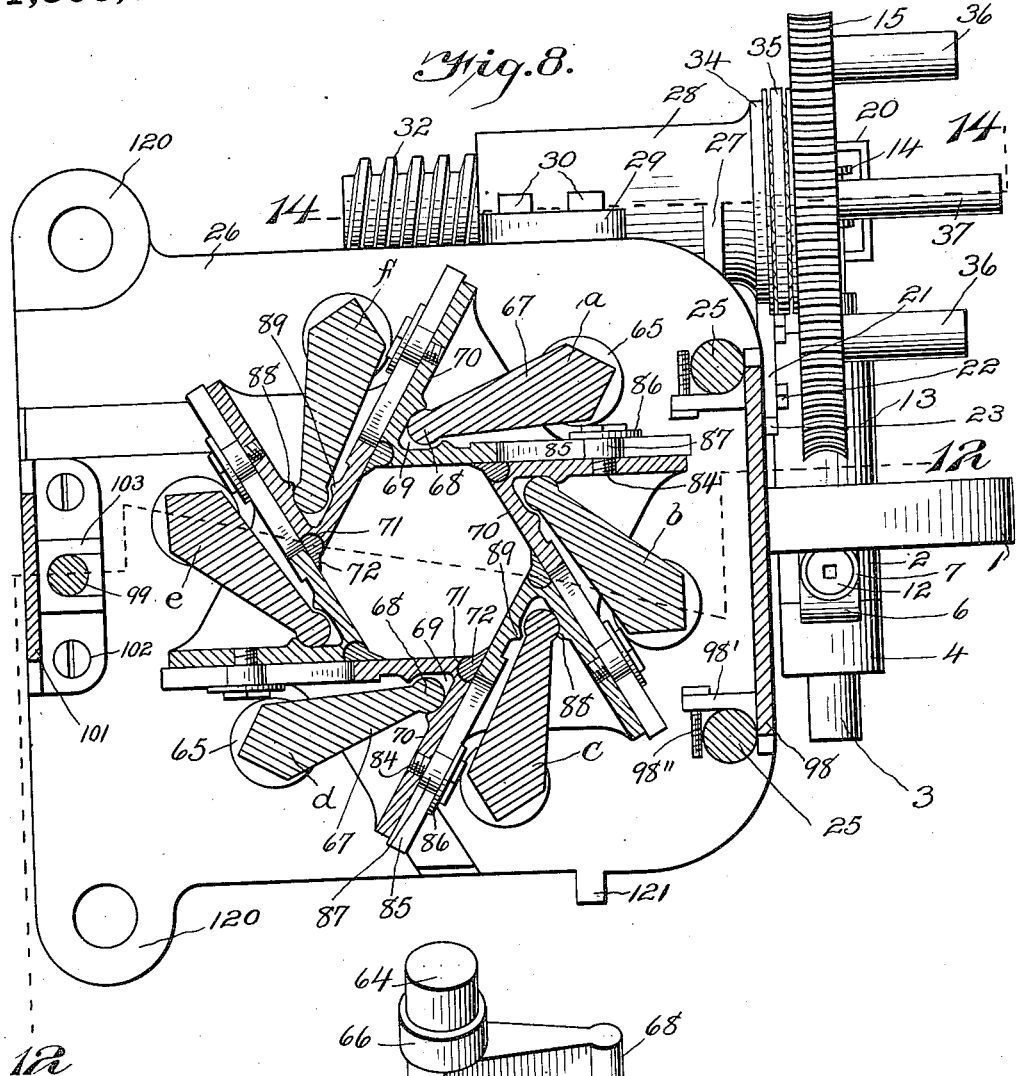
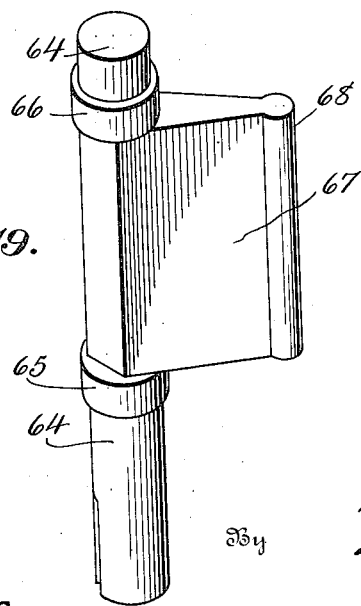

1,300,966.

Patented Apr. 15, 1919.
15 SHEETS—SHEET 9.

Witnesses
T. P. Brett
E. M. Fowler

Inventors
A. J. Hodge
H. B. Ruggles
By Wm. H. Bates
Attorney

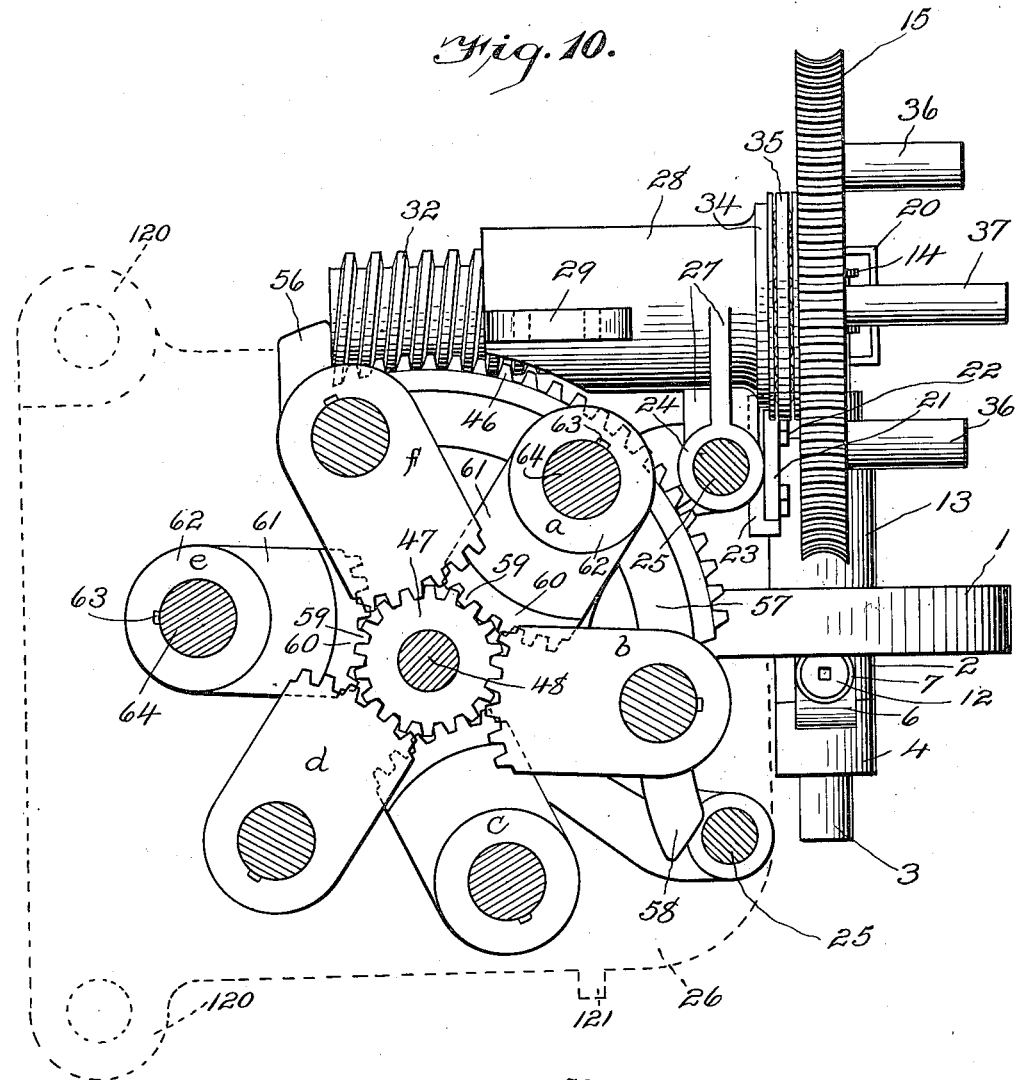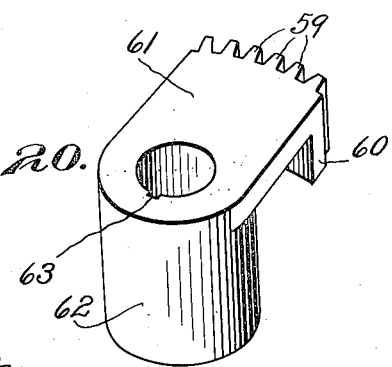

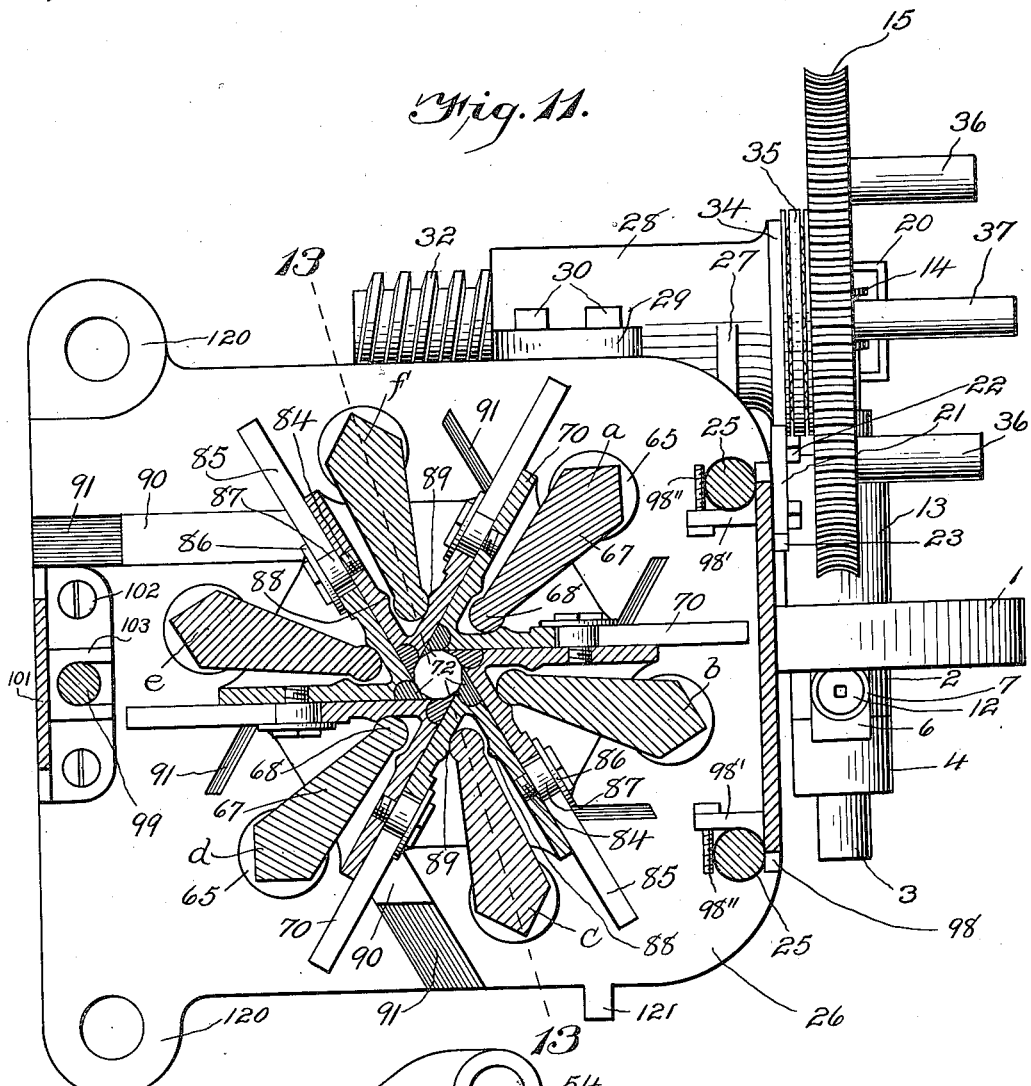
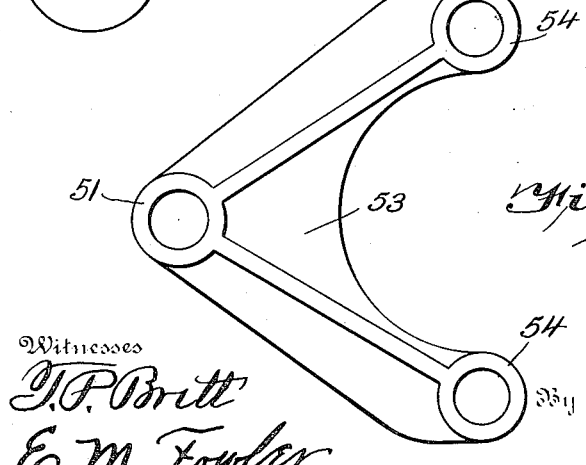

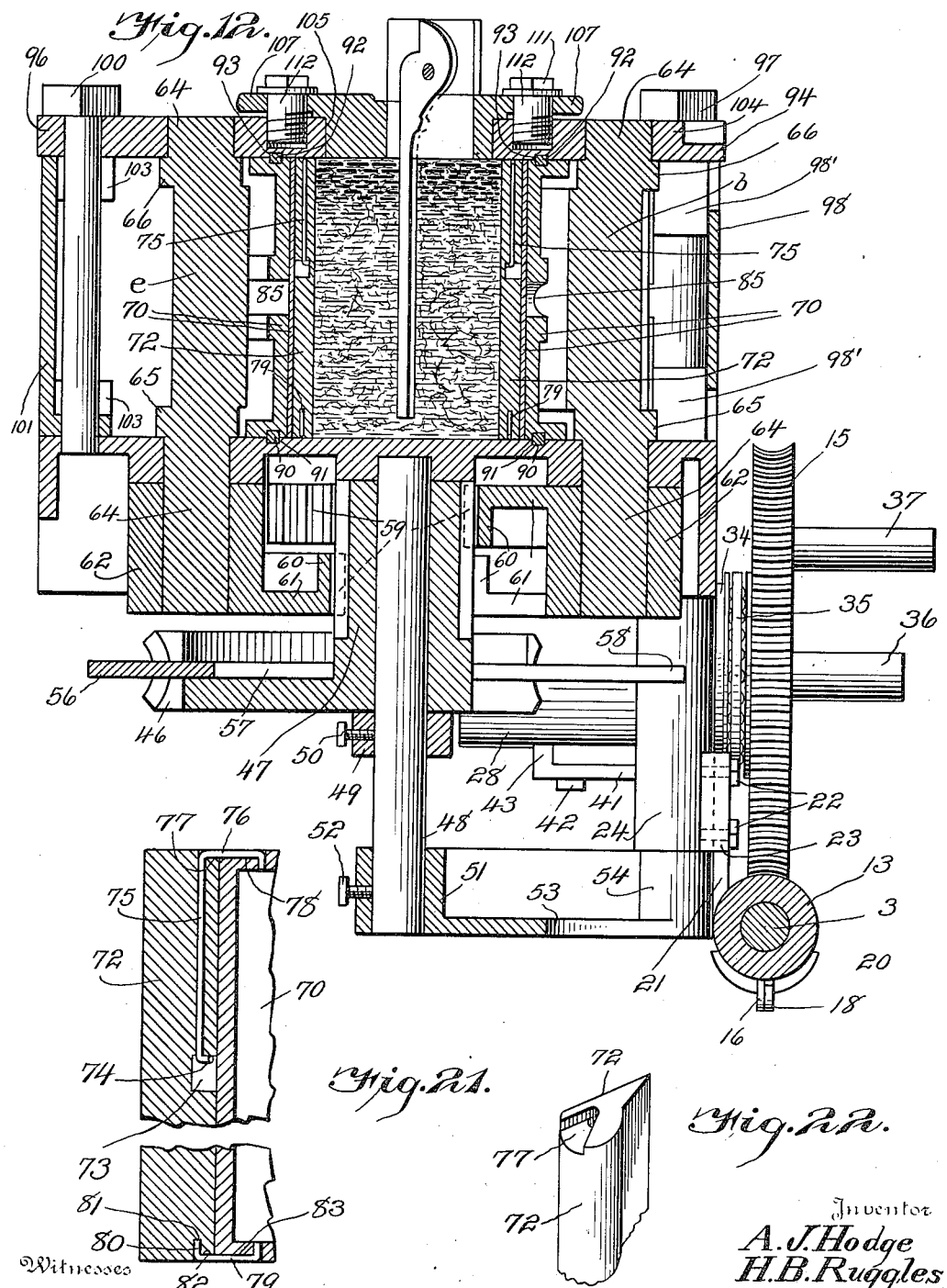

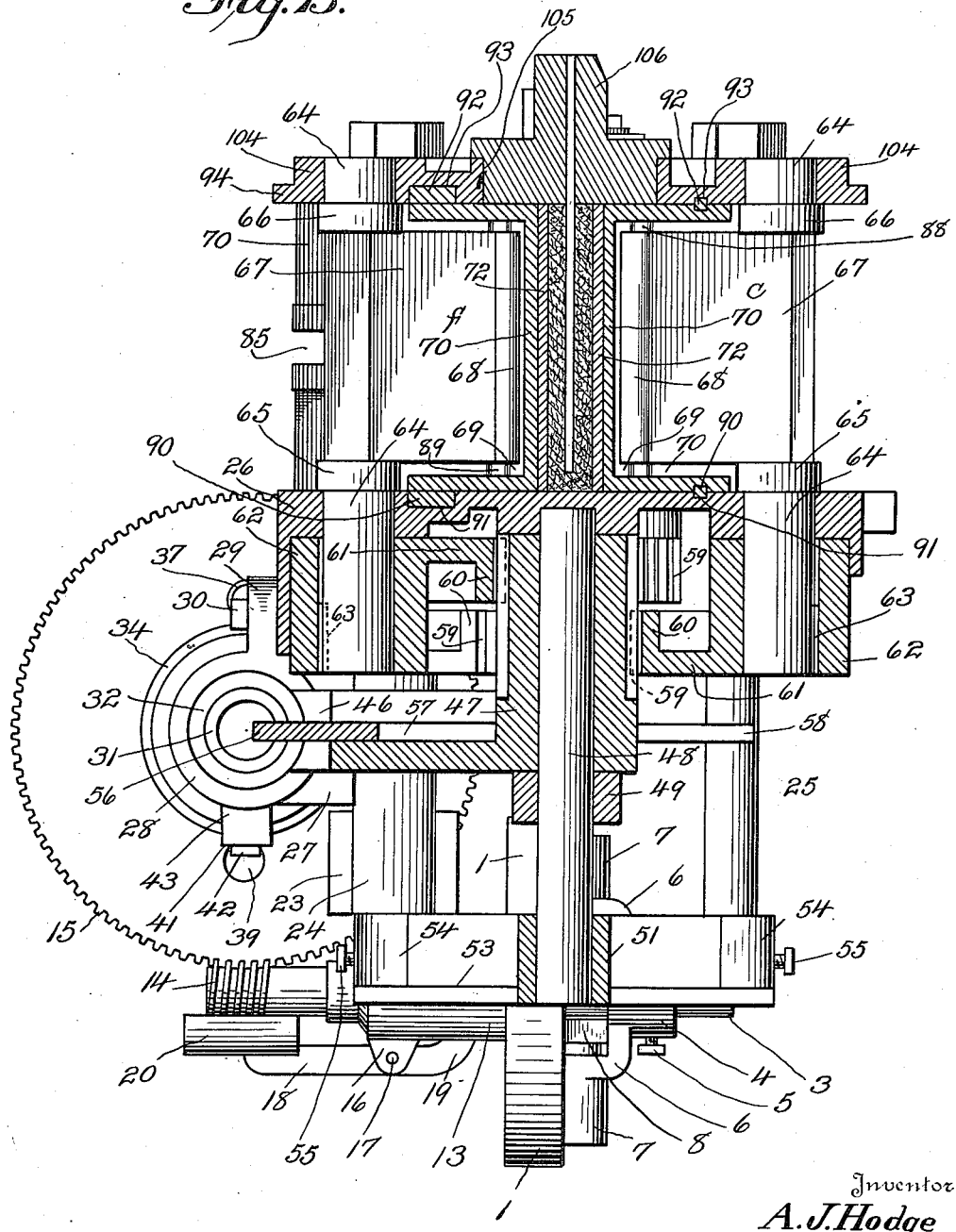

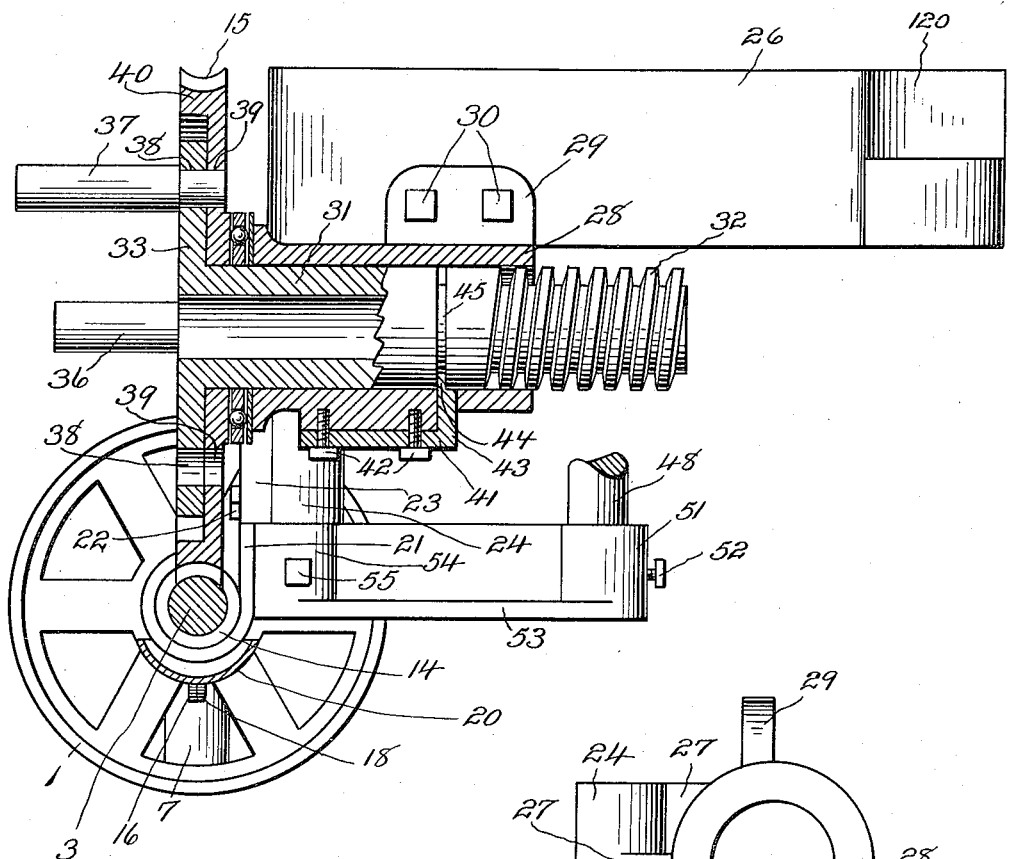
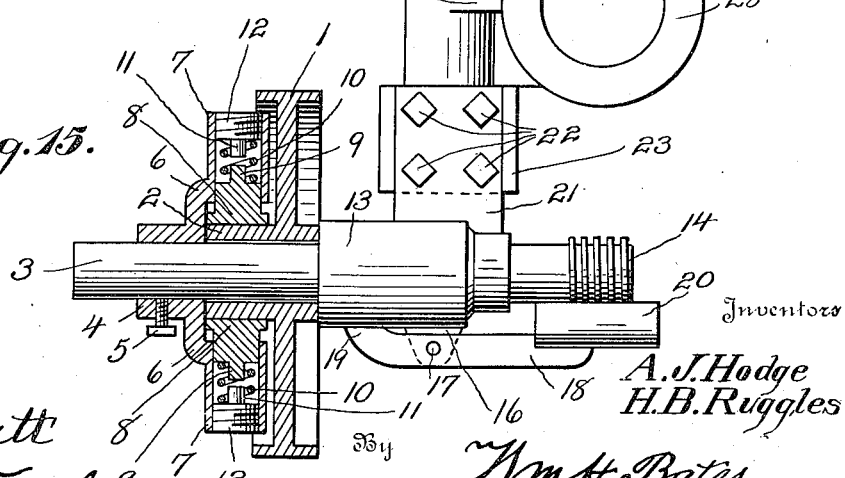

A. J. HODGE & H. B. RUGGLES.
MACHINE FOR PRODUCING EITHER SOLID OR HOLLOW FIBROUS PULP ARTICLES OF VARIOUS FORMS.
APPLICATION FILED APR. 28, 1915.
1,300,966.
Patented Apr. 15, 1919.
15 SHEETS—SHEET 15.
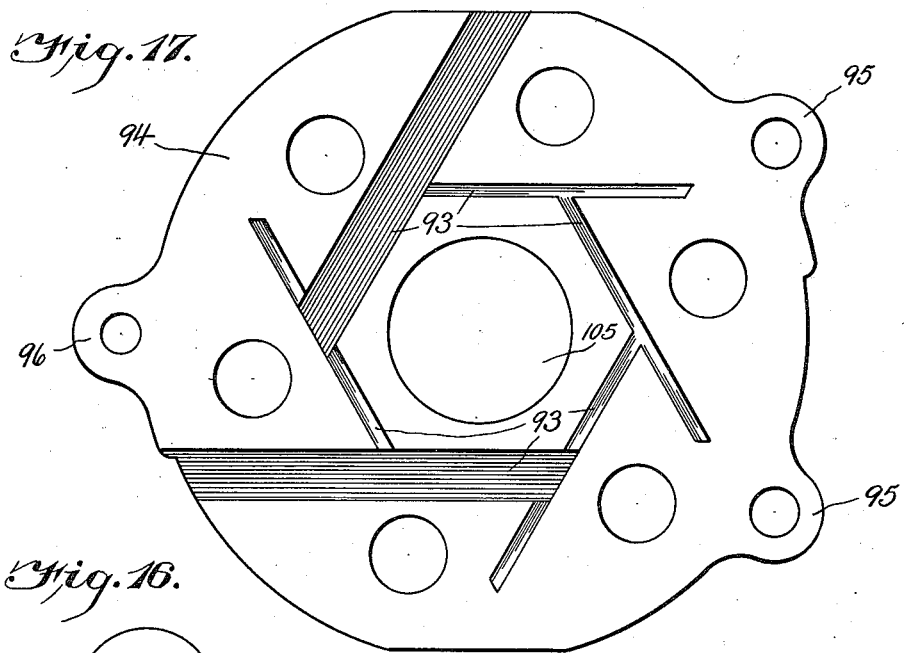
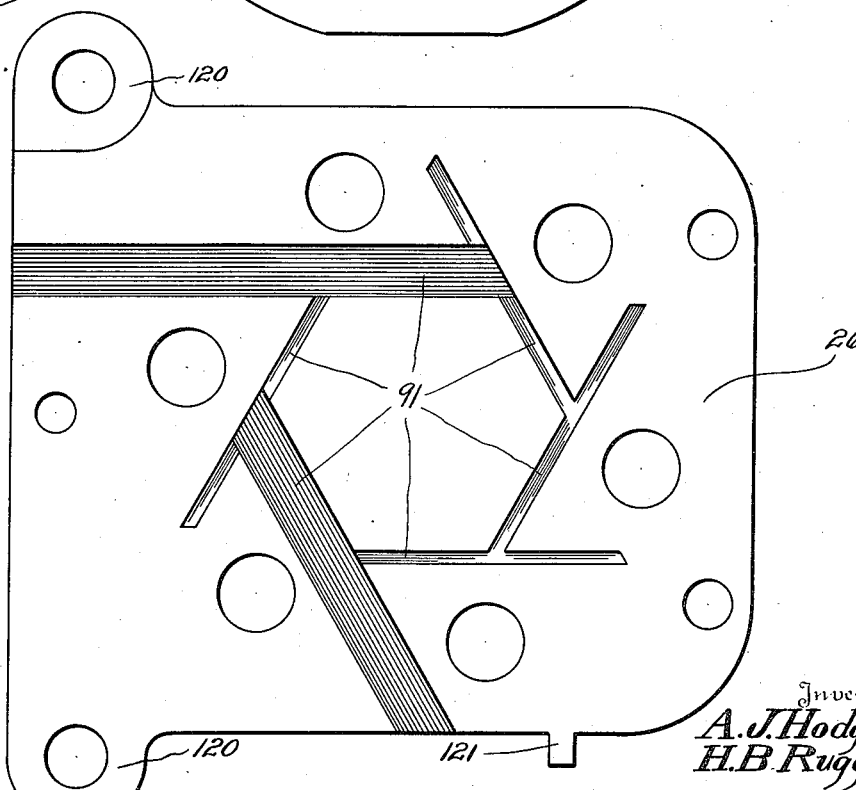
Witnesses
T. P. Britt
E. M. Fowler
Inventors
A. J. Hodge
H. B. Ruggles
By Wm. H. Bates
Attorney

UNITED STATES PATENT OFFICE.

ARTHUR J. HODGE AND HENRY B. RUGGLES, OF PASADENA, CALIFORNIA, ASSIGNORS TO AMERICAN PRODUCTS COMPANY, OF ST. LOUIS, MISSOURI.

MACHINE FOR PRODUCING EITHER SOLID OR HOLLOW FIBROUS PULP ARTICLES OF VARIOUS FORMS.

1,300,966.  Specification of Letters Patent.  Patented Apr. 15, 1919.

Application filed April 28, 1915. Serial No. 24,501.

*To all whom it may concern:*

Be it known that we, ARTHUR J. HODGE and HENRY B. RUGGLES, citizens of the United States of America, residing at Pasadena, in the county of Los Angeles and State of California, have invented certain new and useful Improvements in Machines for Producing Either Solid or Hollow Fibrous Pulp Articles of Various Forms, of which the following is a specification.

This invention has relation to certain new and useful improvements in machines for producing either solid or hollow fibrous pulp articles of various forms and has for its primary object, the provision of a machine of this character in which will be included a series of abutting compressor jaws surrounding the fibrous material to form a chamber for the same and adapted to move around and inwardly against the material and compress the latter to produce the article of the shape and character desired.

The invention has for another object, the provision of a machine of the foregoing character in which the compressor jaws will be arranged in pairs with mechanism for moving the jaws of each pair toward one another to compress the material from opposite sides.

Another object of the invention resides in the provision of compressor jaws of angular formation and arranged with their working faces preferably at such angles with respect to one another as to form a hexagon, and mechanism for moving said jaws inwardly toward the longitudinal center of the machine and returning said jaws to their original or outermost positions without changing the respective angles of said working faces of the jaws.

The invention has for a further object, the provision of a machine of this type in which the compressor jaws will be moved inwardly toward and outwardly away from the longitudinal center of the machine without turning or rotating said jaws.

The invention has for a further object the provision of a machine of this character in which the compressor jaws will be arranged in such manner that one side face of each working jaw will be engaged with and will ride upon the working face of an adjacent jaw during both inward and outward movement of said jaws, thereby preventing the material from moving to position between the compressor jaws during operation of the machine.

The invention has for a still further object, the provision of a machine of this character in which the compressor jaws will always be engaged with one another so that the material may be deposited in the chamber formed by the working faces of said jaws and the finishing lips at the inner corners of said jaws, thereby making it unnecessary to provide a tank within which to place the material to be compressed into the finished article.

A still further object of the invention resides in the provision of improved and novel mechanism for operating the compressor mechanism at an extremely low speed and creating jaws at an extremely low speed and creating an enormous amount of pressure upon the material and thereby compressing the fibers of the material into compact form, with the minimum amount of motive power or by hand if desired.

Still another object resides in the provision of a machine of this character in which the coöperating compressor jaws will be provided, upon their upper and lower faces, with guide strips for sliding movement in guide grooves formed in the head and base and movement of the compressor jaws in either direction will be limited and the machine automatically stopped as said compressor jaws reach their innermost and outermost positions.

The invention has for a still further object, the provision of a machine of the above described character which is especially designed for producing tool handles which will be nonconductive of electricity and heat, and molding said handles during formation of the same, upon the shanks or bodies of the tools, the machine being of such construction and operation, however, that various other solid or hollow articles may be readily produced by the same and the machine may be used as a stationary machine for producing a single article with each operation or may be made in traveling series to produce a number of articles at one time.

With the above and other objects in view, the invention consists in the novel construction, combination and arrangement of parts as will be hereinafter more in detail described and the asserted novelty specifically pointed out in the claims.

In the accompanying drawings which clearly and fully illustrate the invention:—

Figure 1 is a plan view of the complete machine;

Fig. 2 is a front elevation of the same;

Fig. 3 is a rear elevation;

Fig. 4 is a side elevation;

Fig. 5 is a view similar to Fig. 4, showing the opposite side of the machine;

Fig. 6 is a top plan view of the machine with the head and cap removed and the compressor jaws in their outermost positions;

Fig. 7 is a view similar to Fig. 6, with the compressor jaws in their innermost positions;

Fig. 8 is a transverse horizontal section substantially on the plane of line 8—8 of Fig. 5;

Fig. 9 is a transverse horizontal section substantially on the plane of line 9—9 of Fig. 5;

Fig. 10 is a view substantially the same as Fig. 9, showing the position of the compressor jaw operating gear arms when the compressor jaws are in their innermost positions;

Fig. 11 is a view similar to Fig. 8, showing the position of the parts when the compressor jaws are in their innermost positions;

Fig. 12 is a transverse vertical section through the complete machine and substantially on the plane of line 12—12 of Fig. 8, with the compressor jaws in their outermost positions, the closure cap secured in position and the material receiving chamber filled with the material from which the article is to be formed;

Fig. 13 is a transverse vertical section through the complete machine substantially on the plane of line 13—13 of Fig. 11, showing the finished article in the machine;

Fig. 14 is a detail sectional view substantially on the plane of line 14—14 of Fig. 8;

Fig. 15 is a detail sectional view, showing the construction of the safety connection between the drive wheel and drive shaft;

Fig. 16 is a plan view of the base;

Fig. 17 is a bottom plan view of the head;

Fig. 18 is a plan of the segmental worm gear and parts connected with the same;

Fig. 19 is a detail perspective view of one of the compressor jaw operating blades and shafts, removed;

Fig. 20 is a detail perspective view of one of the compressor jaw operating gear arms, removed;

Fig. 21 is a fragmentary detail vertical section through one of the finishing lips and a portion of the compressor jaw by which said finishing lip is carried, showing the manner in which said finishing lip is secured to said compressor jaw;

Fig. 22 is an enlarged detail perspective view of one end of one of the finishing lips;

Fig. 23 is a top plan view of the combined two-part closure cap and tool holder, removed, with the parts thereof separated;

Fig. 24 is an elevation of one part of the combined two-part closure cap and tool holder, looking at the inner face thereof;

Fig. 25 is an elevation of the remaining part of the combined two-part closure cap and tool holder, looking at the inner face thereof; and Fig. 26 is a plan view of the connecting web casting below the base of the machine.

Fig. 27 is a detail plan of one of the lips and the upper resilient locking rod for the same, showing the lip in full lines in normal position, with a line representing the working face of an adjacent jaw against which the lip is engaged, while the position which the lip would assume under influence of the upper resilient locking rod should the adjacent jaw be removed, is shown in dotted lines.

Fig. 28 is a transverse horizontal section of the jaw, taken through the pocket into which the right angled lower end of the upper resilient locking rod is extended.

Referring more particularly to the drawings in which similar reference characters designate corresponding parts throughout the several views, 1 designates the drive wheel which may receive its power from a drive shaft, a motor or any other suitable source. The hub 2 of the drive wheel 1 is loosely mounted upon the horizontal drive shaft 3 and transmits its power to the latter through a safety connection comprising a collar 4 which is locked to the shaft 3 by a set screw 5 or the like and which collar is provided with a pair of opposite arms 6 turned toward the drive wheel 1 and provided upon their free extremities with alined sleeves 7 having slidably engaged in their inner ends the brake shoes 8 which bear against diametrically opposite portions of an extended end of the hub 2 of said drive wheel 1, thereby locking the drive shaft 3 for rotation under normal conditions with the drive wheel 1. The brake shoes 8 have engaged around their reduced inner ends 9, the tension springs 10 which are also engaged around the reduced inner ends 11 of the tension regulating screw plugs 12 which are threaded in the outer ends of the sleeves 7. It will be evident that by rotating the tension regulating screw plugs 12 in the proper direction, the pressure upon the brake shoes 8 may be readily regulated to lock the drive shaft 3 and drive wheel 1 for rotation together as long as said drive shaft 3 is free to rotate with said drive wheel 1, and yet permit the hub 2 of said drive wheel 1 to rotate within said brake shoes 8 after further rotation of the drive shaft 3 is prevented by automatic discontinuance of operation of the parts of the machine driven by the drive shaft 3, without danger of injury to any of the parts of the machine, as will be later clearly understood. The drive shaft 3 is rotatably mounted in a suitable bearing 13 and has a drive worm 14 formed on its projecting end, which drive worm 14 is in mesh with the large worm wheel 15 to drive the latter at an extremely low rate of speed upon rapid rotation of the drive shaft 3.

The bearing 13 has a depending ear 16 which carries a pin 17 having mounted thereon an arm 18, which has one end 19 turned upwardly and engaged against the lower face of the bearing 13 while a grease trough 20 is mounted upon the opposite or outer free end of said arm 18, beneath the drive worm 14. The bearing 13 also has an upwardly directed suspension plate 21 formed therewith and positioned inwardly of the large worm wheel 15 and adapted to be secured by bolts 22 or other suitable securing members to the supporting plate 23 formed with the supporting collar 24, which in turn is engaged around one of the front supporting posts 25 depending from the base 26. The supporting collar 24 is connected, by means of the vertical and horizontal connecting and strengthening ribs 27, with the horizontal stationary bearing sleeve 28 which is positioned at substantially a right-angle to the bearing 13 and drive shaft 3 and in a plane above the same. The horizontal stationary bearing sleeve 28 is further held in position by a longitudinal rib 29 formed on its upper face and adapted to be secured, by suitable securing members 30, to the adjacent side of the base 26.

Rotatably mounted in the stationary bearing sleeve 28 is a hollow worm shaft 31 which has a worm 32 formed on its inner end while a peripheral disk 33 is formed upon its outer end and engaged against the outer face of the large worm wheel 15. The large worm wheel 15 is loosely mounted upon the hollow worm shaft 31, inwardly of the disk 33 and is spaced from the outer or forward flanged end 34 of the stationary bearing sleeve 28 by a suitable spacing and friction reducing bearing 35.

The disk 33 has a plurality of hand grips 36 projecting from its outer face, by means of which said disk 33 and hollow worm shaft 31 with the worm 32 may be rotated by hand, if desired. The disk 33 is shown as being locked for rotation with the large worm wheel 15, however, by means of a removable locking pin 37 having one end engaged in registering openings 38 and 39 extending through the disk 33 and worm wheel 15 respectively. The construction and arrangement of these parts will be readily understood by referring to Fig. 14 and it will also be readily seen by referring to this figure that the large worm wheel 15 is of greater diameter than the disk 33 and is increased in width at its outer or peripheral edge 40, upon which the teeth of said worm wheel 15 are formed and when the disk 33 and large worm wheel 15 are locked together and the latter is driven by the drive worm 14 of the drive shaft 3, the hollow worm shaft 31 will be rotated at an extremely low speed.

It will further be readily understood that longitudinal movement of the hollow worm shaft 31, within the stationary bearing sleeve 28, will be prevented by the key 41 secured to the outer face of said stationary bearing sleeve 28, as shown at 42, and having an extended right angled end 43 with a reduced extremity 44 projecting inwardly through the stationary bearing sleeve 28 and engaged in the peripheral groove 45 formed in the outer face of the hollow worm shaft 31.

The worm 32 is in mesh with the teeth of the segmental worm wheel 46, preferably cast with the central gear 47, which latter is mounted for rotation upon the stationary central shaft 48 of the machine, below the base 26. The central gear 47 is prevented from moving upwardly upon the stationary central shaft 48, by the base 26, while downward movement of said central gear 47 is prevented by the stationary collar 49 adjustably mounted upon said stationary central shaft 48, below said central gear 47 and secured in position by any suitable means, such as the screw 50 shown in Fig. 4.

The stationary central shaft 48 has its upper end secured in the center of the base 26 in any suitable and well known manner while its lower end is preferably secured in the socket 51 by a set screw 52 or the like, said socket 51 being connected by a web casting 53, with similar sockets 54 within which the lower ends of the front supporting posts 25 are secured by set screws 55 or the like.

Rotary movement of the segmental worm wheel 46 and the central gear 47 in one direction is limited by engagement of the extended end 56 of the stop bar 57 with the inner extremity of the worm shaft 31, while rotary movement of the segmental worm wheel 46 and central gear 47 is limited by engagement of the opposite extended end 58 of said stop bar 57 with the side of the supporting collar 24. It will be readily understood, by referring to Figs. 9 and 10, that the stop bar 57 is shown as being of arcuate form and positioned inwardly of the flange of the segmental worm wheel 46, and the ends 56 and 58 of said stop bar 57 are bent at an angle and extended beyond the ends of the segmental worm wheel 46.

Meshing with the central gear 47 are the teeth 59, formed on the arcuate flanges 60 at the inner ends of the gear arms 61, to swing the latter in the proper direction upon rotary movement of the central gear 47. The gear arms 61 have sleeves 62 formed upon their outer ends, which sleeves 62 are keyed, as shown at 63, upon the rotary shafts 64 which are arranged concentrically with respect to the central gear 47 and stationary central shaft 48.

While any suitable number of gear arms 61 and rotary shafts 64 may be employed, the machine is shown as including six of each of these parts with every second gear arm 61 inverted so that the flanges 60 of said gear arms 61 will not interfere with one another during operation of the machine, but will ride above and below one another as said gear arms 61 swing from one position to another, as will be later more clearly understood.

The rotary shafts 64 are extended upwardly through the base 26 and have lower and upper spaced collars 65 and 66, respectively, formed thereon. A compressor jaw operating leaf 67 is formed upon each rotary shaft 64 between the collars 65 and 66 thereof.

Each compressor jaw operating leaf 67 is tapered upon its opposite sides toward its free longitudinal or vertical edge 68, which edge is rounded and loosely engaged in a vertical socket 69 in the corner of one of the angular compressor jaws 70.

In order that the arrangement and operation of the principal parts of this machine may be readily understood, the corresponding gear arms 61, rotary shafts 64, leaves 67 and angular compressor jaws 70 are also lettered $a$, $b$, $c$, $d$, $e$ and $f$.

The compressor jaws 70 are identical in shape and size and are preferably cast with the working face and side face of each jaw meeting at their inner vertical edges to form the inner corner or edge of the jaw, within which is formed a longitudinal or vertical concave recess 71, within which is positioned a finishing lip 72 tapering upon its opposite sides to a fine outer edge, the lip 72 having a rounded inner vertical edge conforming to the shape of the recess 71 and the flat or outer side of said lip resting against the working face of the adjacent compressor jaw, along which said finishing lip 72 slides during inward and outward movement of the compressor jaws.

Each finishing lip 72 is provided, intermediate its upper and lower ends and in its enlarged and rounded inner vertical or longitudinal edge, with a pocket 73, within which extends the right angled lower end 74 of a locking rod 75 which extends downwardly through the lip 72 and which has its upper end 76 bent horizontally and resting in the registering recesses 77 and 78 formed respectively, in the upper face of the lip 72 and the upper face of the compressor jaw 70 by which said lip is carried. The right angled lower end 74 rests against the main or vertical wall of the pocket 73, as will be readily understood by referring to Figs. 12, 21, 27 and 28. The upper end 76 of the locking rod 75 is then bent downwardly at a right angle and forced into a downwardly extending socket in the compressor jaw 70 and at the inner end of the recess 78. It will therefore be seen that the upper end 76 of the locking rod 75 is substantially flush with the upper faces of the lip 72 and the compressor jaw 70 and serves to lock the lip 72 with said jaw 70.

The lip 72 is further locked with the compressor jaw 70 at its lower end by means of a lower locking rod 79 carried by said compressor jaw 70 and having an upturned free end 80 engaged in an upwardly directed socket 81 in the lower end of said lip 72. It will be understood that the lip 72 and compressor jaw 70 have formed in their respective lower faces the registering recesses 82 and 83 to accommodate the main or central portion of the lower locking rod 79.

The compressor jaws 70 are hollow and have their outer sides or backs open, as clearly shown in Figs. 8 and 11, and the side face of each compressor jaw 70 is shorter than the working face thereof and carries a connecting and guide screw 84 which extends through a horizontal guide slot 85 formed in the working face of an adjacent compressor jaw 70 and against which working face said side face is engaged. Each guide screw 84 has a head 86 or the like formed upon the same to retain the compressor jaw working face with which it is engaged, in position against the compressor jaw side face by which said guide screw 84 is carried and said guide screw 84 also has an antifriction roller 87 positioned thereon, within the guide slot 85, to reduce friction to the minimum during movement of the compressor jaws 70.

When the compressor jaws 70 are in their outermost positions, the finishing lips 72 are inwardly of the inner ends of the guide slots 85 and the rounded longitudinal or vertical edges 68 of the compressor jaw operating leaves 67 are engaged against vertical ribs 88 carried by the side faces of said walls of the compressor jaws 70, at the mouth of the vertical sockets 69 of said jaws 70, (as clearly shown in Fig. 8), and the gear arms 61 are in the position shown in Fig. 9, while the extended end 58 of the stop bar 57 is engaged against the supporting collar 24, as will also be readily understood by referring to Fig. 9 of the drawings. Further operation of the operative parts of the machine to move the compressor jaws 70 outwardly will be prevented by the extended end 58.

As soon as operation of the operative parts of the machine is reversed, however, the leaves 67 move into engagement with the ribs 89 carried by the working faces of the compressor jaws 70, at the mouth of the vertical sockets 69 and opposite the ribs 88 and as said leaves 67 continue their swinging movement in this direction they force the compressor jaws 70 to move to their innermost positions, as clearly shown in Figs. 7 and 11.

The compressor jaws 70 are guided in their inward and outward movements by the lower guide strips 90 carried upon their lower faces and engaged in the guide grooves 91 in the upper face of the base 26, and by the upper guide strips 92 parallel with the lower guide strips 90 and carried upon the upper face of said compressor jaws 70 and engaged in the corresponding guide grooves 93 in the underface of the head 94, while the finishing lips 72 are at all times pressed tightly against the working faces of the adjacent compressor jaws 70 by means of the upper resilient locking rods 75, owing to the right angled lower ends of the latter bearing against the main or vertical walls of the pockets 74 of said finishing lips 72, which main or vertical walls of the pockets 74 are at an oblique angle to the straight vertical walls or faces of the finishing lips 72, as clearly shown in Fig. 28.

The guide grooves 91 and 93 are clearly shown in Figs. 16 and 17 and it will be readily seen by referring to these figures, that each compressor jaw 70 has a sliding eccentric movement with respect to the longitudinal axis of the machine, and while the size of the material receiving and molding chamber formed by the working faces of the compressor jaws 70 varies during inward and outward movement of the compressor jaws 70, the shape of the chamber remains the same, as the finishing lip 72 of each compressor jaw 70 simply slides upon the working face of an adjacent compressor jaw toward and away from the finishing lip 72 of the last mentioned compressor jaw, the angle of the working face of each compressor jaw remaining the same with respect to the working faces of the adjacent jaws. It will be understood that while the compressor jaws 70 are shown as being constructed and arranged so that the working faces of said compressor jaws 70 serve as the walls of a material receiving and molding chamber of substantially hexagonal form to give a similar exterior shape to the article produced by this machine, the construction and arrangement of the compressor jaws 70 as well as the number thereof may be readily varied as desired to change the shape of the chamber and likewise change the exterior shape of the compressed pulp article.

The head 94 is provided with two forwardly extended perforated ears 95 and a rearwardly extended perforated ear 96. The forwardly extended perforated ears 95 receive the upper ends of the front supporting posts 25 (previously mentioned) which extend upwardly through the base 26 and after being extended through the ears 95 of the head 94 have suitable securing nuts 97 threaded thereon to retain the said head 94 in position. A front spacing and reinforcing plate 98 extends from one front supporting post 25 to the remaining front supporting post 25 and from the base 26 to the head 94, the lower and upper central portions of said plate 98 being cut away, as clearly shown in Fig. 2 to reduce the weight of the plate and save material without reducing the strength of the same.

The front supporting plate 98 is held in position by clamping screw 98″ extended through the rearwardly directed ears 98′ of said front plate 98, said clamping screw 98″ bearing against the front supporting posts 25 and clamping the front supporting plate 98 against said front supporting posts 25.

The rearwardly extended perforated ear 96 receives the upper end of the rear head supporting shaft 99 which extends upwardly from the rear portion of the base 26 and a suitable securing nut 100 is then threaded upon the upper extremity of said rear head supporting shaft 99. The rearwardly extended perforated ear 96 rests upon the upper end of a rear supporting plate 101 which has its lower end turned inwardly and secured upon the base 26 to either side of the rear supporting shaft 99, as shown at 102. The plate 101 has two or more pairs of arms 103 projecting from its inner face and engaged upon opposite sides of the rear head supporting shaft 99 to strengthen these parts and form a rigid support for the head 94.

The head 94 is also provided with suitable reinforced openings 104 to receive and form bearings for the upper extremities of the shafts 64, above the upper collars 66 thereof, as will be readily understood by referring to Figs. 12, 13 and 17. It will therefore be seen that after the head 94 has been secured in position, the shafts 64 will be held in proper position, as said head 94 forms the upper bearing for said shafts 64 while the base 26 forms the lower bearing for the same, thereby assuring proper operation of the leaves 67 and the gear arms 61 carried by said shaft 64.

The head 94 is also provided with a central opening 105 through which the material may be inserted and the finished article removed, as will presently be clearly understood.

The proper amount of the material is fed to the material receiving chamber formed by the working faces of the compressor jaws 70, while said compressor jaws are in their outermost positions, and it will be understood that this material (preferably a thin fibrous pulp) may be fed to this chamber, by way of the central head opening 105, in any suitable manner. The combined two-part closure cap and tool holder is then placed over the central head opening 105 and secured in position and this combined two-part closure cap and tool holder comprises the opposed coöperating parts 106, the main portions of which are of substantially semicircular form. Each of the parts 106 is provided with an ear 107 projecting from one end and provided in its straight or inner side with an inwardly directed and slightly curved slot 108. The ears 107 are extended in opposite directions and one of the parts 106 has a plurality of locking pins 109 projecting from its straight inner face for engagement in the sockets 110 formed in the inner face of the opposite or remaining part 106, when the parts 106 are brought toward one another and their straight inner faces engaged with one another, thereby locking said parts together and preventing independent movement of the same.

After the parts 106 of the combined two-part closure cap and tool holder have been locked together in this manner, said combined two-part closure cap and tool holder is ready to be placed in position over the central head opening 105 and given a slight turn in the proper direction to force the ears 107 beneath the heads 111 of the locking studs 112, projecting upwardly from the machine head 94, with the shanks or main portions of said studs 112 engaged in the slots 108, thereby securely locking the combined two-part closure cap and tool holder in proper position.

One part 106 of the combined two-part closure cap and tool holder is provided in its straight inner face with a vertical slot 113 to receive the neck of a tool or a part of a tool such as one jaw of a pair of pliers or wire clippers, as clearly shown in Fig. 12, while the head of the jaw rests against the inner face of an upwardly directed ear 114 formed with said part 106, slightly inwardly of the straight inner face thereof, forming a continuation of the inner wall of the slot 113. The upwardly directed ear 114 has a stud 115 projecting from its inner face and engaged through the pivot opening of the tool or tool part and extending into the socket 116 in a corresponding upwardly directed ear 117 carried by the opposite part 106, when said parts 106 are brought together, thereby securely holding the tool or tool part between the parts 106, with the shank or handle of the tool or tool part depending in the center of the material receiving chamber when the combined two-part closure cap and tool holder is secured in position upon the machine head 94, as clearly shown in Figs. 1, 12 and 13. In order to avoid leaving a space between the straight inner edges of the parts 106 after the tool has been secured between the same, the slot 113 is of such size as to permit the tool to rest snugly in the same and the inner face of the upwardly directed ear 117 is flush with the inner edge of the part 106 by which it is carried, thereby permitting the inner faces of the upwardly directed ears 114 and 117 to snugly engage the opposite sides of said tool or tool part, and it will be understood that the size and shape of the upwardly directed ears 114 and 117, as well as the size and character of the slot 113 may be changed as desired to accommodate tools or tool parts, or other articles of various characters.

By referring to Fig. 23, it will be seen that the upwardly directed ears 114 and 117 respectively, are shown as being reinforced and strengthened by suitable lugs 118 and 119 formed therewith and with the parts 106.

After the material has been placed in the material receiving chamber and the combined two-part closure cap and tool holder has been secured in position, with the tool or tool part or other article depending into said material receiving chamber, the large worm wheel 15 is rotated in the proper direction by the drive shaft 3 and drive wheel 1, or by other suitable means to cause the worm 32 to drive the segmental worm wheel 46 engaged therewith and thereby swing the gear arms 61, by means of the central gear 47, and as a result cause the leaves 67 on the shafts 64 to compel movement of the angular compressor jaws 70 from their outermost positions (shown clearly in Figs. 6, 8 and 12) to their innermost positions (shown clearly in Figs. 7, 11 and 13).

During this operation the respective angular compressor jaws 70 move in the directions indicated by the arrows placed upon the upper guide strips 92, in Fig. 6, as said upper guide strips 92 and the lower guide strips 90 slide respectively, in the guide grooves 93 of the head 94 and the guide grooves 91 of the base 26. It will be readily seen that as the angular compressor jaws 20 (which are also lettered *a*, *b*, *c*, *d*, *e* and *f* respectively, in the various views, so that each angular compressor jaw may be readily located and the parts coöperating therewith and also correspondingly lettered may be traced through the several views and the operation of the machine readily understood) move, as indicated by the arrows, to their innermost positions, the material is compressed equally from all sides and the finishing lips 72 also assist the angular compressor jaws 70 in thoroughly compressing the material and producing the tool handle or other article of the desired shape and form with smooth and finished edges. The exterior shape of the article, however, will depend upon the number and character of compressor jaws and their positions with respect to one another, as well as the direction of movement of each of said compressor jaws and it will be evident that these details may be varied as desired.

It will also be evident that an enormous pressure upon the material may be created by this movement of said angular compressor jaws 70 and the latter will move inwardly very slowly as the drive wheel 1 and drive shaft 3 are rotated rapidly with an expenditure of very little motive power to cause the rapidly rotating small worm 14 to revolve slowly the large worm wheel 15 with which it is engaged, thereby greatly increasing the power and revolving the worm shaft 31 and worm 32 very slowly. The power is further increased and at the same time the speed of rotation of the central gear 47 decreased by the worm 32 and the large segmental worm wheel 46. It will therefore be seen that a pressure of hundreds of pounds may be exerted upon the material by the compressor jaws 70 with the minimum expenditure of power by the use of the driving mechanism for the central gear 47 shown and described in this application and the material thereby tightly compressed to form a solid and durable article from a fibrous pulp or the like.

As soon as the angular compressor jaws 70 reach their innermost positions as clearly shown in Figs. 7, 11 and 13, the extended end 56 of the stop bar 57 engages the inner end of the worm shaft 31, thereby preventing further rotation of the segmental worm wheel 46 and the worm shaft 31 as well as the large worm wheel 15 and the drive shaft 3, but permitting the drive wheel to continue its rotation, said drive wheel 1 rotating freely upon the drive shaft 3, and the hub 2 of said drive wheel 1 revolving within the circular series of brake shoes 8 of the safety connection between said drive wheel 1 and said drive shaft 3, thereby eliminating danger of stripping the teeth of the gears or other damage to the operative parts of the machine upon the automatic discontinuance of rotation of the segmental worm wheel 46 and central gear 47 and inward sliding movement of the angular compressor jaws 70.

Upon rotation of the drive wheel 1 in the reverse direction, however, the brake shoes 8 bearing upon the hub 2 of said drive wheel 1, will again lock the latter with the drive shaft 3 and the small drive worm 14 will drive the large worm wheel 15 in a direction opposite the original direction of rotation of said large worm wheel 16 and cause a corresponding rotation of the worm shaft 31 and worm 32. This will cause a slow rotation of the large segmental worm wheel 46 and central gear 47 in the proper direction to cause a return or outward movement of the angular compressor jaws 70 to their outermost positions, the direction of movement of each of the angular compressor jaws 70 during their return or outward movement being indicated in Fig. 7 by the arrows upon the upper guide strips 92 of said angular compressor jaws 70.

As the angular compressor jaws 70 again reach their outermost positions the extended end 58 of the stop bar 57 engages the supporting collar 24, thereby preventing further rotation of the large segmental worm wheel 46 and central gear 47 as well as the shafts 31 and 3 and the parts carried by said shafts, the safety connection between the drive shaft 3 and the drive wheel 1 again serving to prevent injury to the teeth of the gears and other operative parts of the machine, as will be readily understood.

It will be evident that during this outward or return movement of the angular compressor jaws 70 to their outermost positions, the lower and upper guide strips 90 and 92 respectively will slide outwardly in the guide grooves 91 formed in the base 26 and the guide grooves 93 formed in the underface of the head 94, toward the outer ends of said guide grooves 91 and 93. It will further be readily understood that after the angular compressor jaws 70 move outwardly away from the finished handle or other compressed or molded article, the combined two-part closure cap and tool holder may be given a slight turn in the proper direction to swing the ears 107 thereof from beneath the heads 111 of the locking studs 112 and said combined two-part closure cap and tool holder then removed, together with the finished article.

It will also be readily seen that during operation of the machine, the material within the material receiving chamber will be prevented from escaping from the same between the finishing lips and the working faces of the jaws against which said finishing lips are engaged, by the combined pressure of the material against the lips 72 and the action of the upper resilient locking rods 75, thereby securely closing all space between said finishing lips 72 and compressor jaws 70.

It will further be apparent that when it is desired to produce tubes or other hollow articles, a suitable core may be placed in the center of the pulp receiving chamber and, if preferred, secured to the base 26 or formed with the same, or carried in any suitable manner by the closure cap, and the closure cap may be varied in construction and employed simply for closing the upper end or top of the material receiving chamber, instead of serving as a combined closure cap and tool holder as shown and described.

It may also be stated at this time that when the angular compressor jaws 70 are in their outermost or open position and the extended end 58 of the stop bar 57 is engaged with the supporting collar 24, the compressor jaw operating gear arms 61 are in the position shown in Fig. 9 of the drawings and when the angular compressor jaws 70 are in their innermost or closed position, as shown in Figs. 7, 11 and 13, and the extended end 56 of the stop bar 57 is engaged with the inner end of the worm shaft 31, the compressor jaw operating gear arms 61 are in the position shown in Fig. 10 and by means of the letters $a$, $b$, $c$, $d$, $e$ and $f$ employed as before described, the gear arm 61 for operating any certain angular compressor jaw 70 may be readily located.

It may also be here stated that the angular compressor jaws 70 and all of the parts connected with and serving to operate the same, appearing in the elevational views Figs. 2, 3, 4 and 5 inclusive, are shown in their outermost or original positions.

While articles may be constructed with this machine from various materials, the machine is especially adapted for producing articles from a fibrous pulp material by compressing the same into the desired shape or form by means of the compressor jaws 70 and finishing lips 72, as previously described.
When the material is deposited in the material receiving chamber in liquid form, the water or other liquid is preferably evaporated or converted into steam and employed to dry the fibrous pulp as the latter is compressed into proper form. While the preferred mechanism for accomplishing this object is not disclosed in this application as it forms a separate invention and is reserved for the subject matter of another application, any suitable or well known means may be employed.

This machine, as shown and described is constructed for operation as a stationary machine and any suitable means (not shown) may be employed to support the base 26 in proper elevated position with the parts below the same, a suitable distance above the floor or other foundation above which the base 26 is supported, and this machine is shown and described as including only a single base 26, and head 94, and one set of compressor jaws 70 between said base 26 and head 94 and the mechanism for operating said compressor jaws 70 to produce one article at a time.

All of these parts, however, may be duplicated a number of times to form a series of machines of the character shown and described with the base 26 of each connected with the base to either side thereof by suitable connecting members (not shown) passed through the perforated connecting ears or links 120, one ear 120 carried by each base 26 being in a plane below the opposite ear 120 so that the base 26 of each machine may be in substantially the same horizontal plane as the remaining base or bases 26. It will be understood that the ears 120 are at the rear corners of the base 26 and project from the side thereof. Each base 26 also has a tooth 121 projecting from one side adjacent its forward rounded corner which may be engaged by mechanism (not shown) to turn the base 26 and all parts supported by the same as said base reaches one end of a runway or the like when a number of the machines are connected together to form an endless chain and travel upon a runway or track. As this mechanism, however, is the subject matter of still another invention it also is reserved for the subject matter of another application, and therefore will not be shown or further described in the present application.

While the preferred embodiment of the invention has been clearly shown and described, it will be understood that minor changes in the details of construction, combination and arrangement of parts may be resorted to within the scope of the appended claims without departing from the spirit of the invention or sacrificing any of the advantages of the same.

What is claimed is:—

1. A machine of the class described including a base, compressor jaws positioned upon said base, oscillating means for moving said compressor jaws upon said base in constant contact with adjacent jaws to compress a material between said compressor jaws, and means for limiting movement of said compressor jaws.

2. A machine of the class described including a base, a head above said base, means carried by said base for supporting said head, compressor jaws having working faces set at an angle to each other between said base and said head, guide grooves in said base and said head, guide strips carried by said compressor jaws and engaged in said guide grooves whereby the jaws always engage adjacent jaws continuously, an operating shaft for each compressor jaw, a leaf carried by each of said operating shafts and engaged with one of said compressor jaws to move the same toward and away from the longitudinal center of the machine without moving them out of touch, said guide strips riding in said guide grooves during movement of said compressor jaws, and means for limiting operation of said operating shafts in either direction.

3. A machine of the class described including a base, a head above said base, compressor jaws between said head and said base, said compressor jaws being adapted for sliding movement upon the faces of adjacent jaws toward and away from the longitudinal center of the machine, the diametrically opposite compressor jaws moving in opposite directions, lips for forming corners of material compressed on said compressor jaws, operating shafts for said compressor jaws, leaves carried by said operating shafts and engaged with the respective compressor jaws, a central gear, operative connections between said central gear and the operating shafts for said compressor jaws, means for operating said central gear, and means for limiting operation of said central gear in either direction.

4. A machine of the class described including a base, a head supported above said base, compressor jaws between said head and said base, said head having a central opening, a sectional closure cap for said opening, said cap being adapted to support between its sections a member depending therefrom, swinging members for moving said compressor jaws toward said depending member to compress material around the same, means for guiding said compressor jaws, and means for limiting movement of said compressor jaws.

5. A machine of the class described including a base, a central shaft beneath said base, front supporting posts beneath said base, means for connecting said front supporting post and said central shaft, a central gear rotatably mounted upon said central shaft, a head above said base, compressor jaws adapted to move upon the working face of the adjacent jaw between said head and said base, means for driving said central gear in opposite directions, means for limiting movement of said central gear in either direction, and operative connections between said central gear and said compressor jaws to move the latter toward and away from the longitudinal center of the machine.

6. A machine of the class described including a base, a stationary central shaft depending from said base, a central gear rotatably mounted upon said central shaft, a plurality of arms having gears meshing with said central gear, shafts for said gear arms, said shafts extending upwardly through said base, a head above said base, said head forming a bearing for the upper ends of said shafts, a plurality of compressor jaws between said base and said head, leaves carried by said shafts and engaged with said compressor jaws to move the latter toward and away from the longitudinal center of the machine, means for guiding said compressor jaws, and means for rotating said central gear.

7. A machine of the class described including a base, a stationary central shaft depending from said base, a central gear rotatably mounted upon said central shaft, a head above said base, a plurality of compressor jaws between said base and said head adapted to move one upon the other, operative connections between said compressor jaws and said central gear to move said compressor jaws toward and away from the longitudinal center of the machine upon operation of said central gear, a segmental worm wheel carried by said central gear, means engaged with said segmental worm wheel to rotate the latter and said central gear, and a stop bar carried by said segmental worm wheel to limit rotation of said segmental worm wheel and said central gear in either direction.

8. A machine of the class described including a base, cooperating compressor jaws supported upon said base, a stationary central shaft depending from said base, a central gear mounted upon said stationary central shaft, oscillating connections between said central gear and said cooperating compressor jaws to operate the latter, a drive shaft, a worm shaft, operative connections between said worm shaft and said drive shaft, operative connections between said worm shaft and said central gear to drive the latter, means for limiting rotation of said central shaft in either direction, a drive wheel mounted upon said drive shaft, and a safety connection between said drive shaft and said drive wheel to prevent injury to the operative parts of the machine when the central gear reaches its limit of rotation in either direction.

9. A machine of the class described including a base, a stationary central shaft depending from said base, a central gear mounted upon said stationary central shaft, a plurality of shafts arranged concentrically around said central gear and extending upwardly through said base, means for rotating said central gear a limited distance in either direction, inwardly directed gear arms carried by said shafts and having gear segments formed upon their inner flanged ends and meshing with said central gear, certain of said gear arms being inverted to permit the toothed and flanged inner ends of said gear arms to overlap and pass one another during rotation of said central gear, compressor jaws upon said base and inwardly of said shafts, and means carried by said shafts for operating said compressor jaws.

10. A machine of the class described including a base, a central gear, means for supporting said central gear, a segmental worm wheel carried by said central gear, a plurality of abutting compressor jaws mounted upon said base, gear arms connecting said central gear and said compressor jaws to move the latter toward and away from the center of said base, a worm shaft, a worm carried by said worm shaft and engaged with said segmental worm wheel to drive the latter, a large worm wheel loosely mounted upon said worm shaft, means for locking said large worm wheel with said worm shaft, and means for imparting a slow rotary movement to said large worm wheel.

11. A machine of the class described including a base, a central gear, means for supporting said central gear beneath said base, means for imparting a rotary movement to said central gear, a plurality of compressor jaws mounted upon said base and movable upon the working faces of adjacent jaws, a plurality of shafts surrounding said compressor jaws and operatively connected with said central gear, and means carried by said shafts for imparting a sliding movement to said compressor jaws whereby said jaws slide inwardly upon each other.

12. A machine of the class described including a base, a plurality of compressor jaws set tangentially and mounted upon said base, a central gear, means for rotating said central gear in either direction, means for limiting the rotation of said central gear in either direction, a plurality of rotary shafts driven by said central gear, and means carried by each of said shafts and engaged with one of said compressor jaws to cause a sliding movement of the same upon an adjacent jaw upon said base upon rotary movement of said shaft.

13. A machine of the class described including a base, a plurality of compressor jaws arranged concentrically with respect to the center of said base, one side face of each compressor jaw being slidably engaged against the working face of an adjacent compressor jaw, finishing lips secured in the inner longitudinal edges of said compressor jaws forming fillets in the corners between said jaws, a plurality of rotary shafts surrounding said compressor jaws, and means carried by said shafts for imparting a sliding movement to said compressor jaws to cause the same to move upon said base toward and away from the center of the same, the finishing lips engaging one another when said compressor jaws are in their innermost positions.

14. A machine of the class described including a base, a plurality of abutting compressor jaws mounted upon said base, said abutting compressor jaws having their working faces at an angle to one another and at equal distances from the longitudinal center of the machine, said abutting compressor jaws having recesses formed at the inner vertical edges of their working faces, finishing lips secured in said recesses, the finishing lip of each compressor jaw being engaged against the working face of an adjacent compressor jaw and adapted to form fillets between said working faces, and means for causing a sliding movement of said compressor jaws upon said base to move their working faces and finishing lips toward and away from one another.

15. A machine of the class described including a base, a plurality of angular compressor jaws mounted upon said base and arranged concentrically with respect to the longitudinal center of the machine, the working faces of the diametrically opposite compressor jaws being parallel, a finishing lip at the inner edge of the working face of each compressor jaw, means for securing said finishing lips to said compressor jaws, and segmental geared arms for causing sliding movement of the diametrically opposite compressor jaws in reverse directions to move the finishing lips toward and away from one another and decrease and increase the space between the working faces of said compressor jaws.

In testimony whereof we affix our signatures in presence of two witnesses.

ARTHUR J. HODGE.
HENRY B. RUGGLES.

Witnesses:
  R. H. PINNEY,
  EDITH C. SALQUIST.